United States Patent [19]
Kranzler et al.

[11] Patent Number: 5,636,214
[45] Date of Patent: Jun. 3, 1997

[54] BACKPLANE ARCHITECTURE FOR STACKABLE ETHERNET REPEATER

[75] Inventors: David A. Kranzler, Belmont; Ching-Yao Chu, Sunnyvale; Wen-Tsung Tang, Santa Clara, all of Calif.

[73] Assignee: 3Com Corporation, Santa Clara, Calif.

[21] Appl. No.: 481,635

[22] Filed: Jun. 7, 1995

[51] Int. Cl.$^6$ ............................................. H04J 3/14
[52] U.S. Cl. ...................................... 370/438; 370/445
[58] Field of Search ............................ 370/85.1, 85.3, 370/85.9, 56

[56] References Cited

U.S. PATENT DOCUMENTS

| | | | |
|---|---|---|---|
| 5,122,691 | 6/1992 | Balakrishnan | 370/58.2 |
| 5,301,303 | 4/1994 | Abraham et al. | 370/56 |
| 5,388,099 | 2/1995 | Poole | 370/85.1 |
| 5,517,520 | 5/1996 | Chi | 370/85.3 |

*Primary Examiner*—Douglas W. Olms
*Assistant Examiner*—Min Jung
*Attorney, Agent, or Firm*—Townsend and Townsend and Crew LLP

[57] ABSTRACT

A Class II stackable 100 Mbps Ethernet repeater architecture achievable by use of two different types of wired-OR interconnection in an Ethernet backplane, a Bus Transceiver Logic (BTL) wired-OR to selected control, data and clock lines, and a high-speed Transistor-Transistor Logic (TTL) which is wired-OR'ed together in three-level logic on a common activity signal line. The backplane has sufficiently low signal latency to permit two logical repeaters to be connected together with at least eight stackable repeater modules in each logical repeater, each repeater module having thirteen to sixteen station ports to support as many as 254 stations in a 100 Mbps environment with a diameter of 205 meters, which is up to 8.5 times greater than previously achievable.

23 Claims, 2 Drawing Sheets

BACKPLANE ARCHITECTURE FOR STACKABLE ETHERNET REPEATER

BACKGROUND OF THE INVENTION

This invention relates to Ethernet architecture in a 100 megabits/second (Mbps) environment. More particularly, in a specific embodiment, the invention relates to Class II Ethernet stackable repeaters.

Class II Ethernet repeaters are the class that has a sufficiently low latency so that they can be connected together to form a 205 meter diameter, 100 Mbps Ethernet network according to the IEEE 802.3 U standard (currently in Draft 4). In 100 Mbps Ethernet network, a Class I repeater allows only one repeater between any two stations in the network; whereas, a Class II repeater due to its low latency allows two repeaters between any two stations in the network.

The "latency" of a repeater is the total transmission delay of signals through the repeater. Low latency is important in 100 Mbps Ethernet repeaters, because the bit budget is very tight. In a 10 Mbps Ethernet network, four repeaters are allowed between any two stations in the network. The number of repeaters permitted between any two stations in the network is derived from the collision slot time and the delays through the network. A slot time is the maximum time it takes to detect a collision, which equals twice the propagation time for the maximum cable length. The slot time in a worst-case collision scenario on a valid 10 Mbps Ethernet network of maximum size is 51.2 microseconds. In the 10 Mbps Ethernet environment, a slot time of 51.2 microseconds is 512 bit times. However, in the 100 Mbps Ethernet environment, 512 bit times corresponds to a slot time of 5.12 microseconds, i.e, one tenth the slot time in the 10 Mbps Ethernet environment, barring a change in the Ethernet algorithm or packet size. Thus, the bit budget is thus very tight, making low latency very important in 100 Mbps Ethernet repeaters.

One typical Class II Ethernet repeater is non-stackable and has 16 ports, allowing up to 30 stations in a 100 Mbps Ethernet network. After using one port on each repeater to connect together two of these Class II Ethernet 16-port repeaters, the remaining 15 ports on each repeater are available for connection to stations. In 100 Mbps Ethernet, it is desirable to increase the number of stations able to be connected to the network (up to the permitted maximum of 1,024 stations). There is room for improvement in terms of providing a repeater with reduced latency to constitute a Class II repeater and that allows for a greater number of stations in a 100 Mbps Ethernet network.

Other conventional Ethernet stackable repeaters, but which are not Class II repeaters, use a daisy-chained architecture with TTL. The term "stackable" means that multiple copies of identical stackable repeater modules may be connected together and physically stacked to form one logical stacked repeater. Even one such stackable repeater module may itself be used as a logical repeater. This type of stacked repeater architecture is achieved by use of wired-OR interconnection of 4-bit data, data envelope, data clock, ANYXN, and binary ACTN signal lines in the backplane. For this type of stacked repeater daisy-chained architecture, the latency includes the daisy chaining of the acknowledge signals through the repeater module. As the number of repeater modules in the stack are increased, the latency of the logical stacked repeater increases proportionately. Thus, conventional Ethernet stackable repeater modules have been limited in height to five per stack as a Class I repeater, due to the latencies involved in the daisy-chained architecture. It is desirable to have stackable repeaters with a greater amount of repeater modules per stack to permit more stations to connect to the network.

Another conventional Ethernet repeater providing multi-connect capability in a 10 Mbps Ethernet network is a non-stackable repeater having a single chassis with multiple media cards plugged into it. That is, different media cards plug into the same backplane, which includes a serial data line implemented as a differential open collector pair. In this repeater which uses Transistor-Transistor Logic (TTL), the single serial data line is Manchester-encoded, making a clock and envelope signal unnecessary. The backplane of this single chassis repeater has a link activity detect (LAD) signal used to detect the number of ports that are active in the repeater. The LAD signal line is implemented with terminations of 330 ohms and 220 ohms to about +5 V at each end of the backplane in the single chassis repeater. Each card has the ability to pull down the LAD line with its respective open collector NAND gate (such as a 74F38) through a series resistance of about 60 ohms coupled to the LAD signal line. This series resistance matches the characteristic impedance of the line. When zero ports are active, the LAD signal line is at its "quiescent" state of about +3 V. When one port is active, the LAD signal line is at its "one port active" state of about +1.5 V. When greater than one port is active, the LAD signal line is at its "greater than one port active" state of about +1.0 V. However, this kind of non-stackable repeater may not have sufficiently low latency to be a Class II repeater in a 100 Mbps Ethernet environment. It also has the problem of limiting the size of the network, given the relatively small number of ports corresponding to the single chassis, non-stackable repeater. It is desirable to provide a stackable repeater usable as a Class II or Class I repeater that allows flexibility as well as expandability in size in the environment of a 100 Mbps Ethernet network to account for growth of the network in an economically feasible manner.

SUMMARY OF THE INVENTION

According to the invention, a Class II stackable 100 Mbps Ethernet repeater architecture is achievable by use of two different types of wired-OR interconnection in an Ethernet backplane, a Bus Transceiver Logic (BTL) wired-OR to selected signal lines, and a high-speed Transistor-Transistor Logic (TTL) which is wired-OR'ed together in three-level logic on a common activity signal line. In a specific embodiment, the backplane has sufficiently low signal latency to permit two logical Class II repeaters to be connected together with at least eight stackable repeater modules in each logical repeater, each repeater module having thirteen to sixteen station ports to support as many as 254 stations in a 100 Mbps environment having a maximum connection diameter of 205 meter, which is up to 8.5 times greater than previously achievable. In a specific embodiment, 13-port Class II repeater modules are stacked in an architecture of eight units to support 206 stations (with two ports provided for interconnection of logical repeaters).

DESCRIPTION OF THE SPECIFIC EMBODIMENTS

Figure 1:
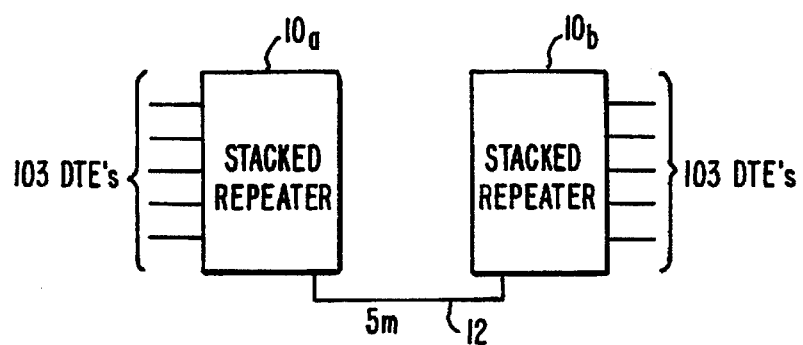
FIG. 1 is a general illustration of an Ethernet network in accordance with the invention.

FIG. 1 illustrates an Ethernet network in accordance with the invention. According to a specific embodiment, the 100 Mbps Ethernet network is made up of two stacked Class II repeaters $10_a$ and $10_b$, connected by a five meter standard Ethernet wire 12. Each stacked repeater ($10_a$, $10_b$) connect, respectively to 103 stations (also known as data terminal equipment or DTEs) through ports on each stacked repeater. Each stacked repeater ($10_a$, $10_b$) is one logical repeater.

Figure 2:
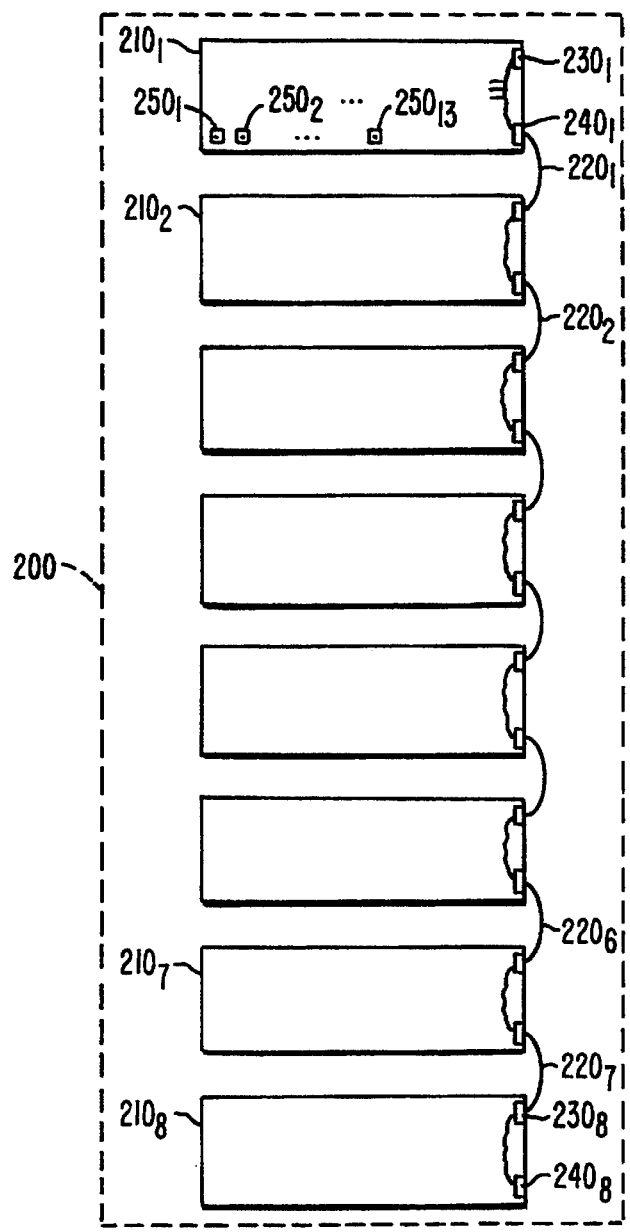
FIG. 2 is a general illustration of a Class II Ethernet stackable repeater according to a specific embodiment of the invention.

FIG. 2 shows a logical Class II stacked repeater 200 according to a specific embodiment of the invention. According to a specific embodiment, stacked repeater 200 includes at least eight identical stackable repeater modules $210_x$ (where x=1 to 8) forming a Class II stacked repeater. The present invention is described in the context of the specific embodiment. However, the invention is not so limited and is capable of being used in 10 Mbps Ethernet networks, and in either Class II or Class I stackable Ethernet repeaters in a 100 Mbps Ethernet network. Of course, in other embodiments logical stacked repeater 200 may include more or even less than eight repeater modules. For example, even one repeater module alone may be used as a logical stackable repeater, to which further repeater modules may be stacked as network demands increase in the future. As another example, at least four repeater modules may be stacked to form a logical stacked Class II repeater. In other embodiments, the stackable repeater modules may be stacked with at least six modules and even higher when used as a Class I repeater. The stackable architecture of the logical stacked repeater allows for great flexibility in determining the number of repeater modules in a stacked repeater in the network, and enables growth and economical expansion of the size of the network in terms of connected stations.

Repeater modules $210_x$ are connected to each other by cables $220_y$ (where y=1 to 7), to form one logical stacked repeater 200. Each repeater module $210_x$ includes an upstream interface $230_x$ to connect to another identical repeater module directly above it, and a downstream interface $240_x$ to connect to another identical repeater module directly below it. Cable $220_y$ is a 68-pin cable with 68-pin connectors at both ends. Repeater modules $210_x$ exchange information using several different logic families including Transistor-Transistor Logic (TTL) and Bus Transceiver Logic (BTL), over cables $220_y$ at 100 Mbps.

Each repeater module $210_x$ also includes at least thirteen ports, each port being connectible to a station or to a standard Ethernet wire. These ports may be, for example, RJ45 ports, with each port connected to a receive pair and a transmit pair in a standard maximum 100 meter wire run to a station. For example, repeater module $210_1$ includes ports $250_i$ (where i=1 to 13). In a specific embodiment, port $250_1$ in repeater module $210_1$ may be adapted using, for example, a slide-in media module (such as a 100 Base-Tx transceiver interface module made by 3Com of California, or the like) to connect to a standard Ethernet wire 12 leading to a second logical stacked repeater similarly connected, thereby creating a 100 Mbps Ethernet network having two Class II Ethernet stacked repeaters. The remaining ports $250_{2-13}$ in repeater module $210_1$ may then be connected to twelve stations. The thirteen ports in each of the other seven repeater modules may then be connected to thirteen stations. Thus in a specific embodiment, logical stacked repeater 200 connects to 103 stations, resulting in a total of 206 stations in the 100 Mbps Ethernet network using two logical stacked repeaters. In alternate embodiments, each repeater module $210_x$ may include a different number of ports. For example, sixteen ports per repeater module in a logical stacked repeater having eight repeater modules would result in a network with two such logical stacked repeaters having up to 254 stations.

Within a repeater module $210_x$, upstream interface $230_x$ logically connects to downstream interface $240_x$, so that all cables $220_y$ linking repeater modules $210_x$ provide continuous signal lines, to which each of the $210_x$ repeater modules is wired-OR'ed and to which ports within each repeater modules are coupled via appropriate conventional logic circuitry. Repeater modules $210_x$ exchange information using two different types of wired-OR interconnection in an Ethernet backplane over cables $220_y$ at 100 Mbps. The logical stacked repeater uses BTL wired-OR to selected data, control, and clock signal lines, and a high-speed TTL wired-OR'ed together in three-level logic on a common activity line. The information, exchanged in parallel, includes: 5 bits of data and control (4 data bits and 1 control bit); a data envelope signal to indicate when the data is valid; a data clock signal; an ANYXN signal to indicate to all other repeater modules that an intra-module collision (more than one port within the signalling repeater module is active) has occurred within the signalling repeater module; and a three-level ACTIVITY signal to indicate to all repeater modules that an inter-module collision (at least one port within each competing repeater module is active) between repeater modules has occurred. (This is done by providing a minimum three-level signal to indicate that zero, one, or more than one repeater module in the entire logical stacked repeater contain active ports.)

The data, control, data envelope, data clock, and ANYXN signals are exchanged using BTL, which is different from TTL. BTL, which is binary, ranges between about 2 volts (logic 0) and about 1 volt (logic 1) (BTL is a standard logic family). The small signal swing of BTL, as compared to signal swings of about 5 V for TTL and CMOS logic families, limits the radiated electrical noise which would otherwise make it difficult for the stacked repeater to pass emissions requirements (such as FCC, VDE, and CISPER). Each of the data, control, data envelope, and data clock signals has an open collector driver that is wired-OR'ed using BTL, to permit any of the repeater modules to drive these signal lines. The ANYXN signal also is wired-OR'ed using BTL, so that the ANYXN signal may be driven low by any of the repeater modules which has an intra-module collision.

Figure 3:
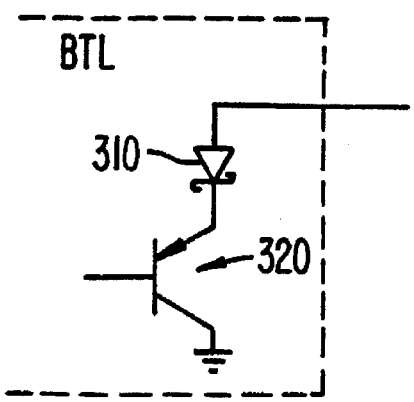
FIG. 3 is an output stage for an open collector-type driver for Bus Transceiver Logic, according to a specific embodiment of the invention.

FIG. 3 illustrates the output stage for an open collector-type driver within the BTL portion of each repeater module, according to a specific embodiment. The output stage of the open collector driver may be a Schottky diode 310 in series with the emitter of a PNP bipolar transistor 320. Schottky diode 310 reduces capacitance. Reducing tap capacitance is important so that a large number of taps may be bused together. Minimizing tap capacitance reduces the associated signal transmission delays, and contributes to lowering latency.

The ACTIVITY signal is a three-level logic signal, using TTL logic with open collector output that is wired-OR'ed to a common ACTIVITY signal line for all the repeater modules. That is, the ACTIVITY signal has three logic levels: a "quiescent" (no ports active) state of about +3.5 V, a "one port active" state of about +2.3 V, and a "greater than one repeater module having at least one active port" state of less than about +1.8 V. If only one port is active in the logical stacked repeater, then the active port will drive ACTIVITY to +2.3 V and will drive the appropriate lines in the backplane with the data, control, data envelope, and data clock signals. The ACTIVITY signal at the "one port active" state indicates to all other ports that the data from the active port should be transmitted by those other ports to their attached stations. Every port in the entire logical stacked repeater will then forward that data to their attached stations. Gating logic within each repeater module prevents the port that is receiving data from its attached station from sending data to that station. If more than one port is active in the network, indicating a collision event, then the active ports stop sending data, and every port transmits a jamming signal, essentially forcing the collision to all ports attached to the network.

In the situation of an inter-module collision (when the ACTIVITY signal is driven to the "greater than one repeater module having at least one active port" state), all ports stop transmitting data to their attached stations and start transmitting the jamming signal, essentially enforcing the collision to all stations on the network. Then, each of the ports in the network continues to look only at the ACTIVITY signal line to determine how long the collision event lasts, and therefore how long to transmit the jamming signal.

In the situation of an intra-module collision, where more than one port is active within a particular repeater module, this particular repeater module on its own does not have the ability to drive the ACTIVITY signal line down to the level of about +1.8 V (the "greater than one repeater module having at least one active port" state). If a repeater module possessed such an ability, tap capacitance would be increased, increasing latency which is not desirable in Class II Ethernet repeaters in a 100 Mbps Ethernet environment. Instead, in the specific embodiment, a repeater module has the ability to drive the ACTIVITY signal line down to the "one port active" state of about +2.3 V in the situation of an intra-module collision. If that repeater module has an intra-module collision, then it will additionally drive the ANYXN signal low to indicate the collision. Therefore, in this situation each repeater module knows that a collision has occurred, despite the ACTIVITY signal line only being at the "one port active" state, from the state of the ANYXN signal and the ACTIVITY signal, and accordingly all other ports switch from sending data to sending the jamming signal to their attached stations.

Each repeater module $210_x$ includes active termination on each of the signal lines. Each repeater module includes logic to indicate whether the repeater module is at the top or the bottom of the stack. This logic permits the repeater module to recognize that it is at the top when its upstream interface is not connected via a cable to another repeater module, and to recognize that it is at the bottom when its downstream interface is not connected via cable to another repeater module. Therefore, appropriate repeater modules recognize when to apply the termination to the data, control, data envelope, data clock, ANYXN, and ACTIVITY signals, thereby terminating these signals only at the ends. An example of the active termination and logic discussed above is discussed in further detail in U.S. Pat. No. 5,341,400, issued Aug. 23, 1994 to Eric Davis for "METHOD AND APPARATUS FOR AUTOMATICALLY SENSING AND CONFIGURING A TERMINATION IN A BUS-BASED NETWORK" and assigned to 3Com of California, and which is hereby incorporated by reference for all purposes.

Figure 4:
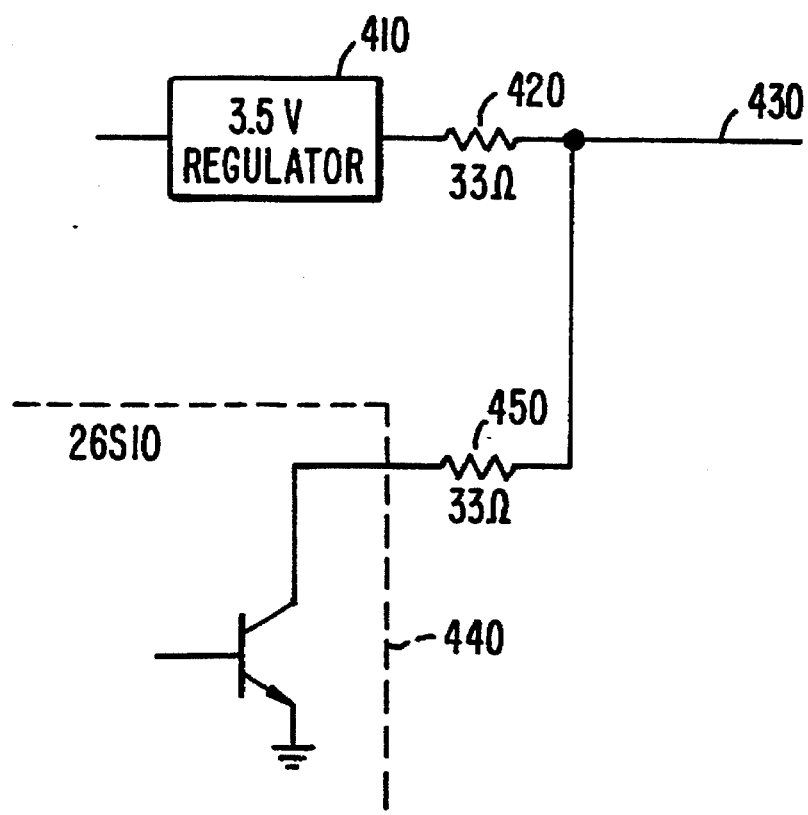
FIG. 4 is a circuit diagram of the ACTIVITY signal line in a specific embodiment of the invention.

FIG. 4 illustrates the ACTIVITY signal line with a representative one of the ACTIVITY signal line taps wired-OR'ed from one of the repeater modules, according to a specific embodiment of the invention. The ACTIVITY signal line is terminated by a 3.5 V regulator 410 through a resistor 420 of about 33 ohms. Resistor 420 matches the characteristic impedance of the common ACTIVITY signal line wire 430, to which repeater modules are wired-OR'ed. A representative repeater module is wired-OR'ed, via driver 440 which is connected through a resistor 450 of about 33 ohms to ACTMTY signal line wire 430. Driver 440 may be for example a 26S10, a TTL open collector driver. When one or more ports within a repeater module is active, that repeater module pulls down the ACTIVITY signal line to +2.3 V and pulls the ANYXN signal low to indicate a collision. If more than one repeater module has one or more ports active within the respective repeater module, then more than one repeater will pull down the ACTIVITY signal line to bring the ACTIVITY signal line to less than about +1.8 V indicating a collision. Thus, the ACTIVITY signal line indicates that more than one repeater module has at least one active port. With the three-level ACTIVITY signal and ANYXN signal, the present invention avoids the increased latency of the daisy chaining of other conventional stacked repeaters, thereby having sufficiently low latency to be a Class II 100 Mbps Ethernet repeater.

The invention has been explained with relation to specific embodiments. It is to be understood that the above description is intended to be illustrative and not restrictive. Many embodiments will be apparent to those of skill in the art upon reviewing the above description. The scope of the inventions should, therefore, be determined not with reference to the above description, but should instead be determined with reference to the appended claims, along with the full scope of equivalents to which such claims are entitled.

What is claimed is:

1. A backplane architecture for a logical stackable Ethernet repeater for an Ethernet network, comprising:

a plurality of stackable repeater modules, each one of said stackable repeater modules being connectable via bus-type signal lines to another one of said stackable repeater modules, said bus-type signal lines including signal lines for transmitting and receiving selected signals and an activity signal line, each one of said stackable repeater modules including a plurality of ports for connection to stations;

wherein each one of said stackable repeater modules is coupled to said signal lines via wired-OR connections using a first logic type; and wherein each one of said stackable repeater modules is wired-OR connected using a second logic type to said activity signal line, said second logic type being different from said first logic type, and said activity signal line having at least three logic states to indicate collisions within said Ethernet network.

2. The backplane architecture according to claim 1 wherein said first logic type comprises Bus Transceiver Logic (BTL).

3. The backplane architecture according to claim 2 wherein said second logic type comprises Transistor-Transistor Logic (TTL).

4. The backplane architecture according to claim 2 wherein each of said stackable repeater modules is wired-OR connected to said bus-type signal lines through a Schottky diode in an output stage of each wired-OR connection.

5. The backplane architecture according to claim 4 wherein one of the selected signal lines indicates an intra-module collision.

6. The backplane architecture according to claim 5 wherein the selected signal lines further include data, control, data envelope, and data clock signal lines.

7. The backplane architecture according to claim 1 wherein said Ethernet network is a 10 Mbps Ethernet network.

8. The backplane architecture according to claim 1 wherein the logical stackable Ethernet repeater comprises a Class II repeater in a 100 Mbps Ethernet network.

9. The backplane architecture according to claim 1 wherein the logical stackable Ethernet repeater comprises a Class I repeater in a 100 Mbps Ethernet network.

10. The backplane architecture according to claim 1 wherein said plurality of ports comprises at least thirteen ports.

11. The backplane architecture according to claim 8 wherein said plurality of stackable repeater modules comprises at least four stackable repeater modules capable of forming a logical stacked Ethernet repeater.

12. The backplane architecture according to claim 8 wherein said plurality of stackable repeater modules comprises at least eight stackable repeater modules capable of forming a logical stacked Ethernet repeater.

13. The backplane architecture according to claim 9 wherein said plurality of stackable repeater modules comprises at least six stackable repeater modules capable of forming a logical stacked Ethernet repeater.

14. The backplane architecture according to claim 7 wherein said plurality of stackable repeater modules comprises at least eight stackable repeater modules capable of forming a logical stacked Ethernet repeater.

15. The backplane architecture according to claim 1 wherein each one of said stackable repeater modules is capable of operating as a logical Ethernet repeater on its own.

16. The backplane architecture according to claim 1 wherein each one of said stackable repeater modules is connectable to another one of said stackable repeater modules via a cable.

17. The backplane architecture according to claim 1 wherein one of the selected signal lines is for indicating an intra-module collision.

18. The backplane architecture according to claim 17 wherein one of said at least three logic states of said activity signal line indicates an inter-module collision within said Ethernet network.

19. The backplane architecture according to claim 1 wherein one of said at least three logic states of said activity signal line indicates an inter-module collision.

20. A stackable repeater module capable of being used in a logical stackable Ethernet repeater for an Ethernet network, said stackable repeater module comprising:

a plurality of ports for connection to stations;

at least one interface connectable to another of said stackable repeater module via bus-type signal lines, said bus-type signal lines including signal lines for transmitting and receiving selected signals and an activity signal line;

first wired-OR connections to said signal lines via said at least one interface, said first wired-OR connections being of a first logic type; and second wired-OR connections to said activity signal line via said at least one interface, said activity signal line having at least three logic states to indicate collisions within said Ethernet network, one of said three logic states indicating an inter-module collision, and said second wired-OR connections being of a second logic type different than said first logic type.

21. The stackable repeater module according to claim 20 wherein one of said signal lines indicates an intra-module collision.

22. The stackable repeater module according to claim 21 wherein said at least one interface comprises a cable interface.

23. The stackable repeater module of claim 20 wherein said first logic type comprises BTL and said second logic type comprises TTL.

* * * * *